Oct. 31, 1961 M. R. KARECKI 3,006,477
FILTER
Filed Aug. 29, 1957 3 Sheets—Sheet 1
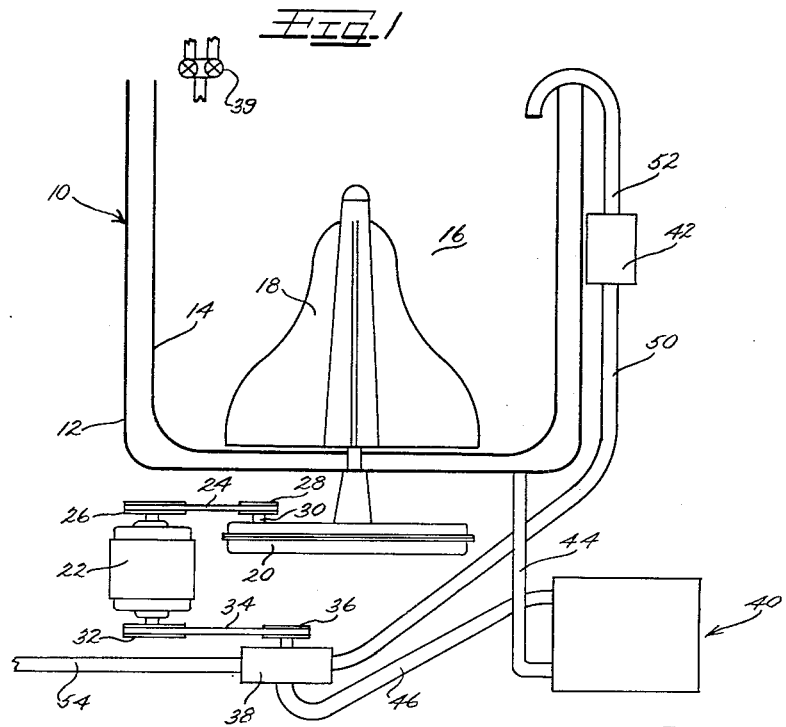
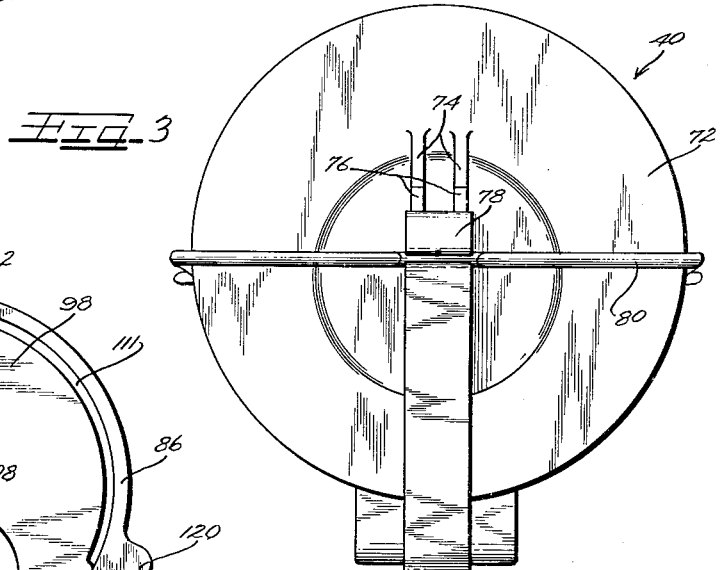
Inventor
MARION R. KARECKI
By Hill, Sherman, Meroni, Gross & Simpson Attys Oct. 31, 1961  M. R. KARECKI  3,006,477
FILTER
Filed Aug. 29, 1957  3 Sheets-Sheet 2

Inventor
MARION R. KARECKI
By Hill, Sherman, Meroni, Gross & Simpson Attys

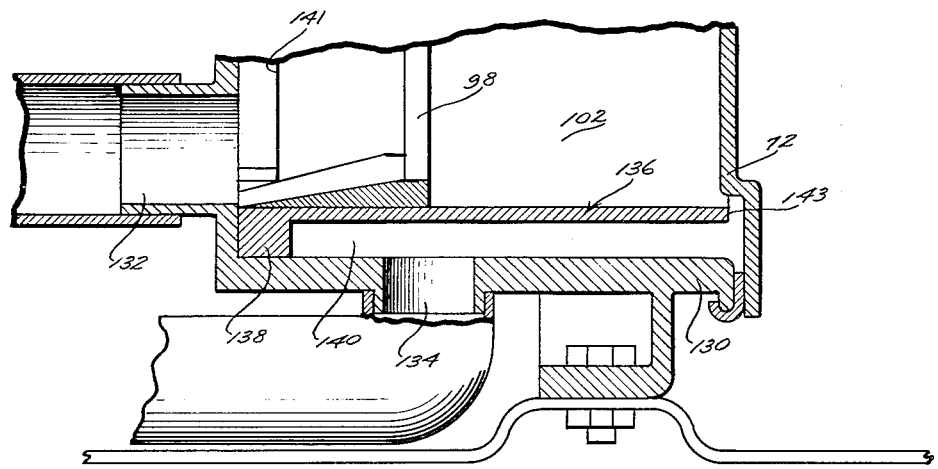
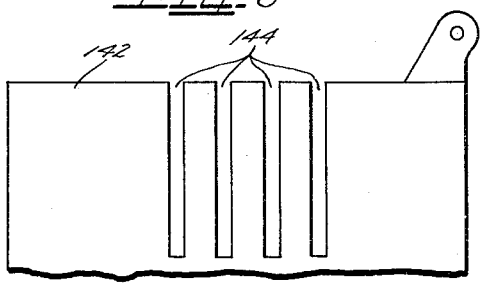
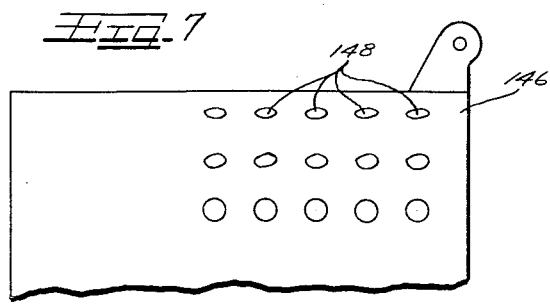

United States Patent Office 3,006,477
Patented Oct. 31, 1961

3,006,477
FILTER
Marion R. Karecki, St. Joseph, Mich., assignor to Whirlpool Corporation, St. Joseph, Mich., a corporation of Delaware
Filed Aug. 29, 1957, Ser. No. 681,053
4 Claims. (Cl. 210—195)

The present invention relates to improvements in apparatus for filtering particles from a liquid and especially to an apparatus for entrapping large particles in a laundering liquid other than lint and other smaller sized particles.

The present invention is especially adapted to be used in a filtering system such as that employed in an automatic laundering machine wherein the laundering liquid is recirculated for the removal of foreign particles for clearing of the laundering fluid. The filter may be employed in a fluid flow conduit means and is adapted to remove heavy particles such as buttons, stones, nails, hairpins, and other heavy or rigid particles which might damage or clog subsequent filtering equipment or pumps which are used to circulate the liquid.

Accordingly, an object of the invention is to provide an improped filtering mechanism which is expressly adapted to the improved removal of foreign particles other than lint or small sized particles from a liquid flow stream without appreciably lessening the flow of liquid.

Another object of the invention is to provide an improved particle removing apparatus for use in a system ahead of a pump and other filtering equipment for removal of particles which might damage or clog the equipment downstream of the filter.

A further object of the invention is to provide an improved filtering apparatus for the removal of larger particles from a liquid flow stream wherein the particles are retained and collected in the filter in a manner in which they may be readily removed from the filter and the filter may be quickly and simply cleaned.

Another object of the invention is to provide an improved particle removing filter of simplified and improved construction.

A still further object of the invention is to provide a particle removing filter having an improved flow distribution arrangement for conducting the fluid therethrough and for removing particles from the liquid.

Other objects and advantages will become more apparent with the teachings of the principles of the invention throughout the disclosure of the preferred embodiment in the specification, claims, and drawings, in which:

FIGURE 1 is an elevational view, shown schematically, of a laundry machine combination employing the particle filter of the present invention;

FIGURE 3 is an end elevational view of the particle filter;

FIGURE 4 is an end elevational view of the removable trap member;

FIGURE 5 is a vertical sectional view, similar to FIGURE 2, but showing an alternate arrangement for the discharge of the cleared fluid;

FIGURE 6 is a side elevational view of the trap member illustrating an alternative form thereof; and, FIGURE 7 is another side elevational view of the trap member illustrating another form.

Figure 2:
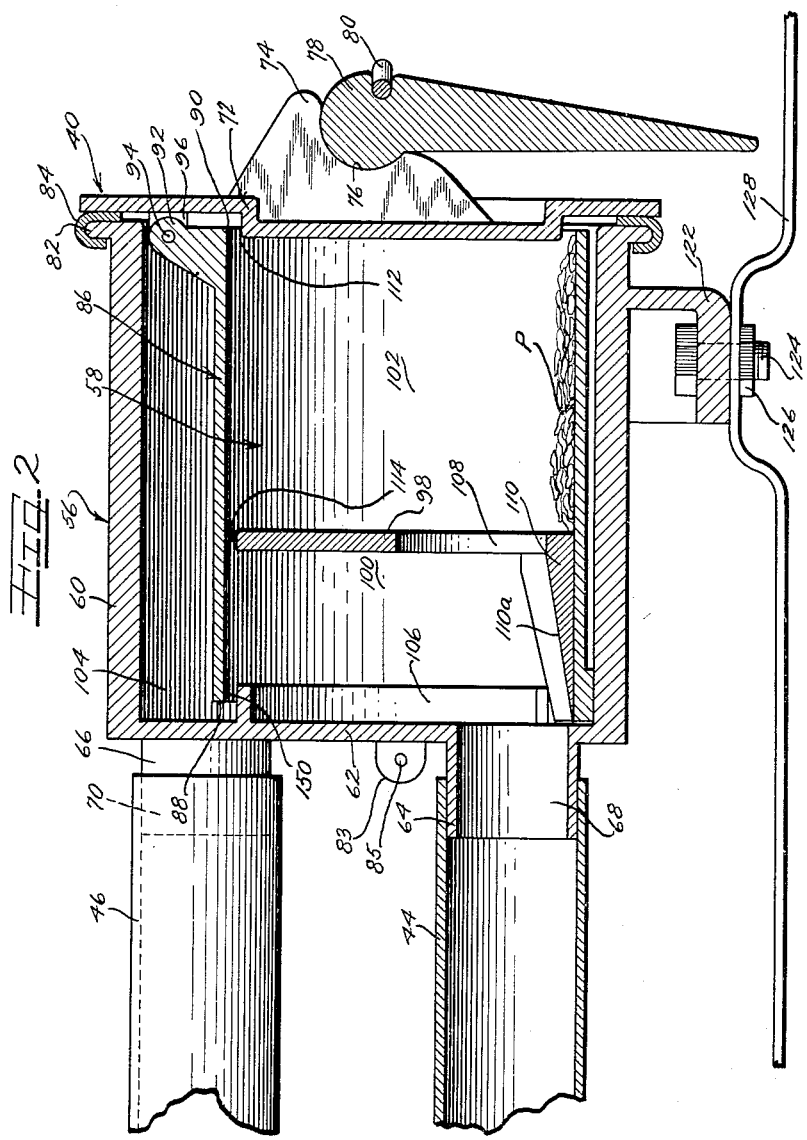
FIGURE 2 is an enlarged sectional view taken through the particle filter of the present invention.

The filter mechanism embodying the principles of the present invention is illustrated and described in its preferred forms as utilized in combination with a laundry machine. Numerous advantages are attained in the combination shown but it will be understood that the principles of the filter may be utilized in other embodiments taking advantage of the inherent qualities thereof.

As illustrated in FIGURE 1, a laundry machine 10 is provided with a container 12 for laundering liquid. Within the container is a basket 14 or the like defining a laundry zone 16 therein. Within the laundering zone articles of clothing or the like to be washed are subjected to the laundering fluid. An agitator 18 may be provided driven in oscillation by power derived from mechanism housed in a gear case 20. The power transmission gears within the gear case 20 drive the agitator 18 and rotate the basket 14 for a spin dry operation to centrifugally separate the liquid from the articles being laundered at the end of the laundering operation.

The power from the gear case 20 is obtained from a drive motor 22 which drives a belt 24 passing over a pulley 26 on the motor and a pulley 28 connected to a shaft 30 driving a mechanism within the gear case. The motor 22 may be provided with another drive pulley 32 which drives a belt 34 driving a pulley 36 to operate a pump 38.

The pump operates to circulate the liquid for operating the laundry machine. At the beginning of the laundry operation, a supply of laundering liquid is supplied through a mixing valve 39 to the container 12. During the laundering operation, the liquid is continually circulated through a filtering system to remove undesirable particles from the laundering liquid and to clear the liquid for improved laundering operation. The undesirable particles consist of particles of dirt and soil such as grit, sand, buttons, nails, hairpins, and so forth. The liquid will also contain lint, threads, and the like which are also removed by the filtering system. In accordance with the present invention the heavier, larger particles are removed by a particle filter 40 which is located ahead of the pump 38 and ahead of another filter 42, so that the large particles are removed to protect the pump and prevent clogging the system or the second filter 42. The filter 40, thus removes heavy particles except the small particles and the lint which are removed by the second filter 42 which is in series in the flow system. The filter 42, which need not be described in detail in the present disclosure, operates to remove the fine particles and the lint from the washing liquid.

The liquid in passing through the flow system leaves the laundry container 12 through an outlet conduit 44 which leads into the particle filter 40. The fluid which is cleared of particles except the fine particles and lint leaves the particle filter 40 through the conduit 46 which enters the pump 38. The liquid is discharged from the pump through the conduit 50 which leads into the second filter 42. The completely cleared fluid leaves the second filter 42 through the conduit 52 which is positioned to deliver fluid back to the laundry container 12.

The pump 38 is also shown as operative to deliver the liquid received from the container, after it passes through the particle filter 40 through the conduit 54 which leads to a drain or to a suds storage container. A suitable conduit and valve arrangement may be provided whereby the conduit 54 will direct the fluid either to a suds storage container or a drain and will be connected to the suds storage container for return of the sudsy fluid for a succeeding washing operation when the operation of the pump 38 is reversed. Whereas, other flow arrangements may be employed, the system preferably passes all of the liquid through the particle filter 40 thereby protecting the pump 38 inasmuch as the large particles which would do damage to the pump are removed for all operation of the pump in pumping liquid from the laundry container 12.

FIGURES 2 and 3 illustrate in enlarged detail the construction of the particle filter 40. The particle filter 40 has a housing 56 which is cylindrical in shape and defines a filter or particle separation chamber 58 therein. This chamber is divided into compartments as will be later described.

The housing 56 has a cylindrical outer wall 60 and an end wall 62. The end wall is provided with bosses 64 and 66 which are hollow so as to provide an inlet passageway 68 and an outlet passageway 70 from the separation chamber 58 and the passageways communicate with the conduits 44 and 46 which connect through the bosses 64 and 66.

The housing 56 is open at the end opposite the inlet and outlet passageways and this opening is provided with a circular cover 72. The center of the cover carries a raised projection 74 provided with an arcuate seat 76 which receives a cover securing handle 78. The handle is attached to a cover securing spring 80 having end portions 85 clipped into a boss 83 at the end of wall 62. The flange 82 also carries a gasket member 84 in order that the cover may seat thereagainst in liquid tight relationship. As will be noted on the drawings, especially FIGURE 2, the handle 78 pivots about the cover spring 80 and is eccentric so as to seat in the arcuate recess 76 and clamp the cover tightly in place when the handle 78 is pivotally rotated.

Attached to the cover is an inner shell or trap member 86, which is also shown in detail in FIGURE 4. The shell 86 is in the shape of a cylindrical tube which is shorter than the filter chamber 58 so as to provide flow paths around the ends 88 and 90 of the shell 86.

The shell is provided with a bracket 92 having a lateral hole therethrough so as to receive a pivotal pin 94 for carrying the shell on an ear 96 secured to the under surface of the cover 72. Thus, when the cover is removed from the housing 56, the shell 86 may be pulled from the interior of the housing. This is done for purposes of cleaning and it will be noted that the separated particles P settle at the bottom of the shell 86 and are withdrawn as the shell is withdrawn from the filter chamber 58.

The cylindrical shaped trap member or shell 86 is eccentrically located within the housing 56. As illustrated in FIGURE 2, the shell has a vertical trap shield 98 therein so as to divide the interior of the trap member 86 into an entrance compartment 100 and a trap compartment 102. The eccentric location of the shell 86 within the housing 56 provides an outlet flow compartment 104.

An annular flange 106 projects inwardly a short distance from the end wall 62 of the housing and is of a diameter less than the shell 86. The annual flange 106 provides a flow passageway 150 for the liquid leaving the entrance compartment 100.

As the liquid enters the inlet passageway 68 it flows into the entrance compartment 100. The trap shield 98 is provided with a horizontally elongated circular opening 108 at the base into which the majority of the liquid flows to pass into the trap compartment 102. There the liquid engages the slow moving liquid and becomes turbulent to cause a dispersal and a dissipation of the lint and to drop the heavy particles and the particles with large surface areas as illustrated at P.

Leading into the trap compartment 102 before the opening 108 in the trap shield 98 is a particle guide ramp 110. This ramp has a substantially horizontal surface 110a which is inclined upwardly toward the trap compartment 102 and guides the particles to the trap compartment.

The removable shell 86 is located eccentric to the center line of the housing 56. This position permits a smooth entrance of the liquid from the passageway 68 and also permits the water level to drop to a minimum for removal of the shell and the cover 72. As the liquid enters the inlet passageway 68 it is moving at a high velocity carrying the objects forward through into the trap compartment 102. At this point turbulence occurs due to the slower moving body of water and helps break up lint particles. The lighter particles will flow toward the exit passageways from the trap compartment. These passageways are located at 112, between the end 90 of the shell and the cover 72, and at 114 between the inner surface of the shell and the outer edge of the trap shield 98 which is of a diameter smaller than the inside of the shell 86, as shown in FIGURE 4. The liquid flowing through the outlet 114 will flow through the passageway 108. A portion of the fluid will leave the entrance compartment 100 through the flow passageway 108. Because of the rapid flow of liquid and the inertia of the objects, and with the assistance of the ramp 110, substantially all of the heavy particles will flow into the trap compartment 102. The trap shield 98 may be integral with the shell or may be attached to the inside. For this purpose, the lower surface of the ramp 110 is curved to be secured, such as by cementing, to the shell. The shell 86 is provided with a flange 116 at the front edge to rest on the inner surface of the housing. Ears 118 and 120 are provided to seat in grooves, not shown, in the inner surface of the housing 56 for aiding in orientating the position of the trap member within the housing 56.

The entire filter assembly is supported on a bracket 122 integral with the housing 56 and provided with an opening for receiving a bolt 124. The bolt receives a nut 126 for mounting the filter assembly on a support wall 128 which may be part of a bracket or a part of the laundry machine frame work.

In FIGURE 5, an alternate form of the housing and shell arrangement is illustrated with an outlet passageway 134 for cleared liquid at the bottom of the housing. In this figure similar parts are provided with numbers corresponding to the numbers used in FIGURE 2.

A housing 130 is provided with an inlet passageway 132 and a discharge passageway 134. Within the housing is a trap member or shell 136 which is provided with the trap shield 98 and other elements similar to the shell shown in FIGURE 2. The shell 136 has a forward flange 138 which is sufficiently large to raise the shell above the lower portion of the housing 130. This provides a larger outlet flow compartment 140 below the shell. The outlet flow compartment communicates with the outlet passageway 134. Thus, the liquid flowing from the trap compartment 102 will flow around the ends 141 and 143 of the shell and leave the housing through the outlet passageway 134 at the base of the housing 130.

FIGURE 6 illustrates another form of the trap member of shell which may be used with the housing 56 of FIGURE 2. A trap member 142 is shown which is tubular in shape and is provided with substantially the same construction as the trap member 86 in FIGURE 2. Additional flow outlets are provided, however, shown in the form of arcuate slots 144 extending across the upper surface of the shell 142. These arcuate slots provide a direct outlet for the liquid leaving the trap compartment within the shell and the liquid will flow into the outlet flow compartment shown at 104 in FIGURE 2.

In the arrangement of FIGURE 7, a trap member 146 is illustrated also provided with separate flow openings for the liquid to leave the trap compartment. In this case, the flow openings are shown consisting of a plurality of circular holes 148. The separated liquid carrying the lint and other fine particles, but which is devoid of heavy particles, flows through the openings 148 into the outlet flow compartment 104 illustrated in FIGURE 2.

Reviewing the operation of the particle separating apparatus, as shown in FIGURE 2, the liquid enters the inlet passageway 68 flowing through the entrance compartment 100 with heavy particles being directed up the ramp 110 and flowing with the liquid through the opening 108 in the trap shield 98. In the trap compartment liquid, which is moving at a high velocity, meets the slower moving body of water and turbulence occurs. This drops the heavy particles P and disperses the lint and other very fine particles to flow onwardly with the liquid. The liquid leaves through the passageway 112 at the end of the shell 86 and the flow passageway 114 between the edge of the trap shield 98 and the shell 86 to flow outwardly through passageway 150 at the end 88 of the shell. The liquid thus flows all along the outer surface of the shell 86 leaving the housing 56 through the outlet flow compartment 104 and through the outlet passageway 70.

For cleaning the trap, the handle 78 is pivoted to release position and the cover with the attached shell are withdrawn to flush the shell and remove the heavy particles. The shell and cover are then replaced for further operation.

The liquid is drawn through the trap and conduit 46 by the pump. Since the particles having large surface areas have been removed, the chance of damage occurring to the pump is substantially removed. The liquid is then forced by the pump through the second filter 42, FIGURE 1, which removes the fine particles and lint. The heavy particles, having been removed in the trap compartment 102 will not interfere with the operation of the filter 42 and will not plug the conduits leading to the filter.

Thus, it will be seen that I have provided an improved filtering apparatus which meets the objectives and advantages hereinbefore set forth. The machine has been provided with a filtering system which enables continual operation of the machine with the laundering liquid being continually cleared. The filter can be operated continuously and being in series with the pump, will remove all larger particles from the liquid thereby protecting the pump and clearing the liquid.

The filter is not complicated in construction and does not require power for operation, and does not utilize moving parts. The principles embodied in the filter illustrated perform a superior separation operation which is extremely well adapted to use with a laundering machine. In the form illustrated, the filter is easily operated and can be readily and simply cleaned by the operator or housewife.

I have, in the drawings, and specification, presented a detailed disclosure of the preferred embodiment of my invention, and it is to be understood that I do not intend to limit the invention to the specific form disclosed, but intend to cover all modifications, changes and alternative constructions and methods falling within the scope of the principles taught by my invention.

I claim as my invention:

1. In a separator, inner and outer generally cylindrical members comprising a closed outer housing and an open-ended inner shell disposed within said housing on substantially a horizontal axis, said inner shell being eccentrically offset towards the bottom of said outer housing and together therewith forming an outlet flow compartment providing a generally horizontal fluid flow path, said housing having an upper outlet formed therein communicating with said outlet flow compartment, and an inlet near the bottom thereof in communication with the interior of said shell and providing a generally horizontal fluid flow path thereto, said shell having a generally vertically disposed partition dividing the interior thereof into a trap compartment and an entrance compartment, said partition having an aperture formed therein in register with said inlet, and said shell being spaced at one end from said housing adjacent the top thereof to communicate said trap compartment with said outlet flow compartment, whereby fluid is directed into said trap compartment in one horizontal direction so that cleared fluid is discharged through the space between said shell and housing and from said outlet flow compartment in an opposite horizontal direction and impurities are retained in said trap compartment.

2. In a separator, inner and outer generally cylindrical members comprising a closed outer housing and an open-ended inner shell disposed within said housing on substantially a horizontal axis, said inner shell being eccentrically offset towards the bottom of said outer housing and together therewith forming an outlet flow compartment providing a generally horizontal fluid flow path, said housing having an upper outlet formed therein communicating with said outlet flow compartment, and an inlet near the bottom thereof in communication with the interior of said shell and providing a generally horizontal fluid flow path thereto, said shell having a generally vertically disposed partition dividing the interior thereof into a trap compartment and an entrance compartment, said partition having an aperture formed therein in register with said inlet, said shell having an inclined ramp surface along the bottom thereof between said inlet and said partition, and said shell being spaced at one end from said housing adjacent the top thereof to communicate said trap compartment with said outlet flow compartment, whereby fluid is directed into said trap compartment in one horizontal direction so that cleared fluid is discharged through the space between said shell and housing and from said outlet flow compartment in an opposite horizontal direction and impurities are retained in said trap compartment, said ramp surface being effective to guide impurities in the fluid from said inlet and into said trap compartment.

3. In a separator, inner and outer generally cylindrical members comprising a closed outer housing and an open-ended inner shell disposed within said housing on substantially a horizontal axis, said inner shell being eccentrically offset towards the bottom of said outer housing and together therewith forming an outlet flow compartment providing a generally horizontal fluid flow path, said housing having an upper outlet formed therein communicating with said outlet flow compartment, and an inlet near the bottom thereof in communication with the interior of said shell and providing a generally horizontal fluid flow path thereto, said shell having a generally vertically disposed partition dividing the interior thereof into a trap compartment and an entrance compartment, said partition having an aperture formed therein in register with said inlet and being spaced along the upper portion thereof from said shell, said shell and said housing adjacent the top thereof providing at their opposite ends fluid flow passages communicating said trap compartment with said outlet flow compartment at one end and the space between said partition and said shell with the outlet at the opposite end to provide a flow path for cleared fluid from said trap compartment to said outlet supplementing the action of said outlet flow compartment, whereby fluid is directed into said trap compartment in one horizontal direction so that cleared fluid is discharged through said fluid flow passage at one end of said shell from said outlet flow compartment and through said space between said partition and said shell and through said fluid flow passage at the opposite end of said shell and in an opposite horizontal direction and impurities are retained in said trap compartment.

4. In a separator, inner and outer generally cylindrical members comprising a closed outer housing and an open-ended inner shell disposed within said housing on substantially a horizontal axis, said inner shell being eccentrically offset towards the bottom of said outer housing and together therewith forming an outlet flow compartment providing a generally horizontal fluid flow path, said housing having an upper outlet formed therein communicating with said outlet flow compartment, and an inlet near the bottom thereof in communication with the interior of said shell and providing a generally horizontal fluid flow path thereto, said shell having a generally vertically disposed partition dividing the interior thereof into a trap compartment and an entrance compartment, said partition having an aperture formed therein in register with said inlet and being spaced along the upper portion thereof from said shell to provide a flow path for cleared fluid from said trap compartment to said outlet supplementing the action of said outlet flow compartment, said shell being of lesser axial length than said housing to provide with said housing near the top thereof and at opposite ends fluid flow passages communicating at one end with said outlet flow compartment and at the other end with said outlet to direct cleared fluid to said outlet from said space between said partition and said shell, whereby fluid is directed into said trap compartment in one horizontal direction so that cleared fluid is discharged from said outlet flow compartment and through said space between said partition and said shell in an opposite horizontal direction and impurities are retained in said trap compartment.

References Cited in the file of this patent

UNITED STATES PATENTS

| | | |
|---|---|---|
| 415,093 | Corcoran | Nov. 12, 1889 |
| 888,576 | Bartholomew | May 26, 1908 |
| 1,637,902 | Holland | Aug. 2, 1927 |
| 1,760,229 | Arndt | May 27, 1930 |
| 1,956,833 | Raymond et al. | May 1, 1934 |
| 2,044,096 | Moran | June 16, 1936 |
| 2,338,971 | Ross | Jan. 11, 1944 |
| 2,343,743 | Breckenridge | Mar. 7, 1944 |
| 2,548,568 | Swank | Apr. 10, 1951 |
| 2,586,508 | Brotman | Feb. 19, 1952 |
| 2,614,026 | Lascari | Oct. 14, 1952 |

FOREIGN PATENTS

| | | |
|---|---|---|
| 47,711 | Norway | Mar. 24, 1930 |
| 677,289 | Great Britain | Aug. 13, 1952 |